United States Patent
Wang et al.

(10) Patent No.: US 7,574,532 B2
(45) Date of Patent: Aug. 11, 2009

(54) MULTI-FUNCTIONAL PERIPHERAL COMBINATION APPARATUS AND CONTROL METHOD THEREOF

(76) Inventors: Chueherh Wang, 1F, No. 21, Lane 643, Wen Lin Rd., Shih Lin Dist., Taipei City (TW); Chunn-Cherh Kuo, 15F-3, No. 7, Lane 11, Li Yuan I St., Tung Shih Tsun, Lin Kou Hsiang, Taipei Hsien (TW); Shiang-Li Chen, 4F, No. 4, Lane 327, Lin 19, Erh Chung Li, Ming Hsing Rd., Chu Tung Jen, Hsin Chu Hsien (TW); Wei-Hsiang Liao, No. 30, Lane 166, Pei Ta Rd., Hsin Chu City (TW)

( * ) Notice: Subject to any disclaimer, the term of this patent is extended or adjusted under 35 U.S.C. 154(b) by 425 days.

(21) Appl. No.: 11/033,815

(22) Filed: Jan. 13, 2005

(65) Prior Publication Data

US 2006/0155890 A1 Jul. 13, 2006

(51) Int. Cl.
*G06F 3/00* (2006.01)
*G06F 13/12* (2006.01)

(52) U.S. Cl. ............................................. 710/8; 710/62

(58) Field of Classification Search ...................... 710/8
See application file for complete search history.

(56) References Cited

U.S. PATENT DOCUMENTS

| 6,134,606 A * | 10/2000 | Anderson et al. | 710/14 |
| 6,286,060 B1 * | 9/2001 | DiGiorgio et al. | 710/8 |
| 6,442,625 B1 * | 8/2002 | Robinson et al. | 710/8 |
| 2003/0135668 A1 * | 7/2003 | Abe | 710/15 |

* cited by examiner

*Primary Examiner*—Henry W. H. Tsai
*Assistant Examiner*—Juanito C Borromeo
(74) *Attorney, Agent, or Firm*—Perkins Coie LLP

(57) ABSTRACT

A multi-functional peripheral combination apparatus includes a multi-functional peripheral, a portable electronic equipment and a transforming unit being electrically connected between the multi-functional peripheral and the portable electronic equipment for image management, file management and other administrative affairs. Furthermore, the operation applied to both of the portable electronic equipment and the multi-functional peripheral is configured to preview the working image before the processing of the multi-functional peripheral, and then to edit and revise the image.

20 Claims, 3 Drawing Sheets

MULTI-FUNCTIONAL PERIPHERAL COMBINATION APPARATUS AND CONTROL METHOD THEREOF

BACKGROUND OF THE INVENTION

1. Field of the Invention

The present invention relates to a multi-functional peripheral combination apparatus and a control method thereof, and particularly to a multi-functional peripheral combination apparatus utilizing a control method for enabling transmission of a variety of data between a multi-functional peripheral and a portable electronic equipment.

2. Description of Related Art

Nowadays, due to the increasing development of the personal computer industry, various computer peripherals have been marketed, including multi-functional peripherals functioning as, for example, copy machines, printers, fax machines or scanners. The multi-functional peripherals have become necessary machines in an office, so that most administrative affairs are performed in cooperation with multi-functional peripherals.

There are various types of multi-functional peripherals in the market; however, they all have one common problem in that the control panel thereof is too small. The small control panel is only capable of performing a few functions so that the users cannot monitor all information with respect to the conventional multi-functional peripherals. Besides, when the conventional multi-functional peripheral is used as a scanner or a printer, the user cannot preview, edit or revise the working image. These disadvantages waste paper due to incorrect data or further editing.

SUMMARY OF THE INVENTION

The present invention is to overcome the above and other disadvantages and deficiencies of the conventional multi-functional peripherals and to provide a multi-functional peripheral combination apparatus and control method thereof. The multi-functional peripheral of the present invention couples to a portable electronic equipment with a large display panel that overcomes the disadvantages of the conventional peripherals with a small display panel. Further, the operation applied to both of the portable electronic equipment and the multi-functional peripheral is configured to preview the working image before the processing of the multi-functional peripheral, and then to edit and revise the image.

The present invention provides a multi-functional peripheral combination apparatus and a control method thereof. The multi-functional peripheral combination apparatus includes a multi-functional peripheral, a portable electronic equipment having a display panel and a transforming unit being electrically connected between the multi-functional peripheral and the portable electronic equipment, thereby to transmit a variety of data from the display panel of the portable electronic equipment into the multi-functional peripheral. Furthermore, the user can monitor the working status of the multi-functional peripherals through the larger display panel so as to preview, edit and revise the image.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DESCRIPTION OF THE PREFERRED EMBODIMENTS

Figure 1:
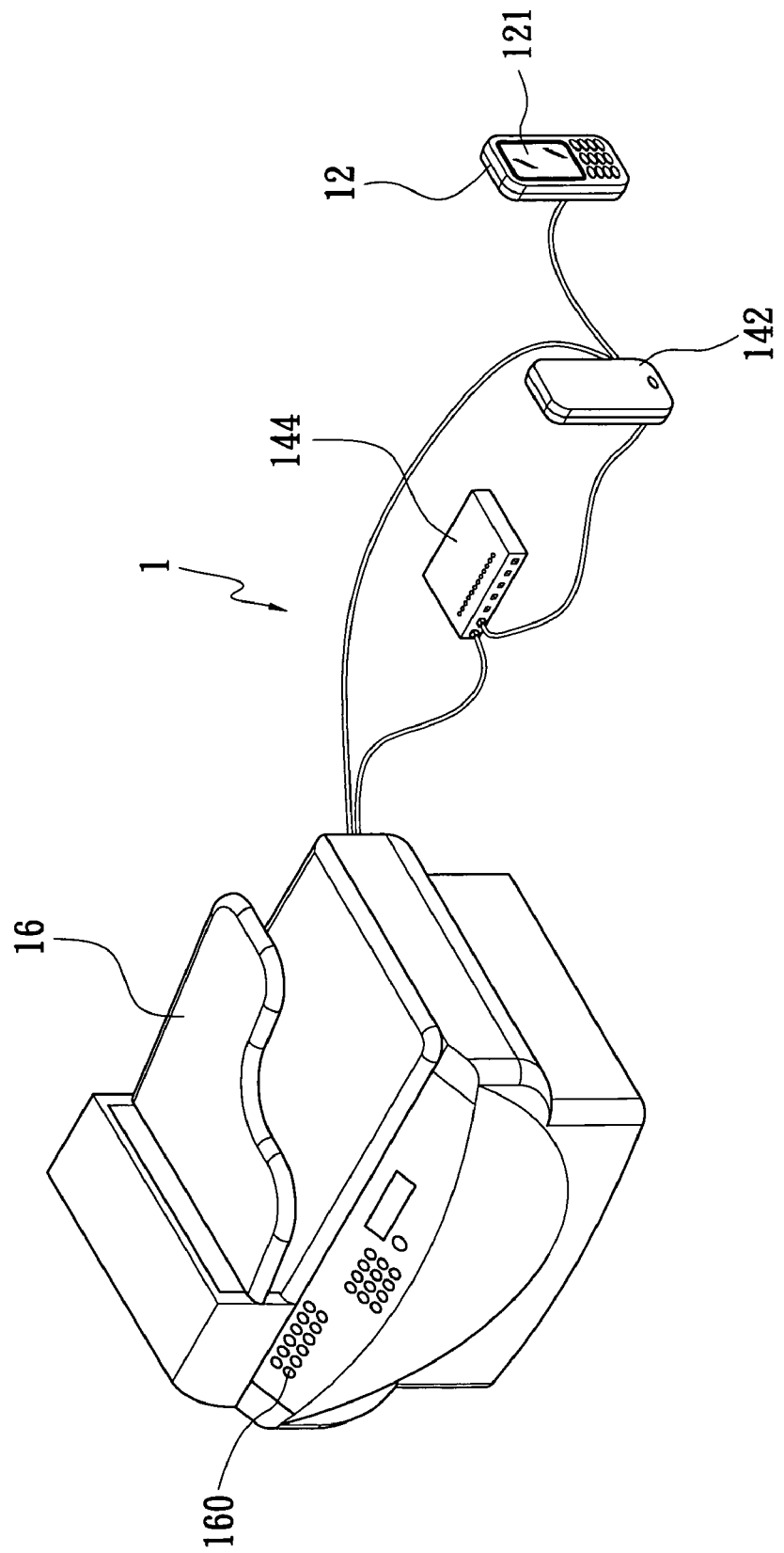
FIG. 1 is a perspective view showing a multi-functional peripheral combination apparatus according to an embodiment of the present invention.

FIG. 1 is a perspective view of a multi-functional peripheral combination apparatus according to a preferred embodiment of the present invention. The combination apparatus 1 includes a portable electronic equipment 12 having a display panel 121 (such as a LCD panel), a transforming unit 14 and a multi-functional peripheral 16. The portable electronic equipment 12 can be electrically connected to the multi-functional peripheral 16 by means of the transforming unit 14.

The user can control and manage the data transmission and compilation between the portable electronic equipment 12 and the multi-functional peripheral 16 by processing a specific application program configured by a controlled processor 122 in the portable electronic equipment 12. The user can also monitor the status of the data process of the multi-functional peripheral 16 from the display panel 121 of the portable electronic equipment 12 so as to preview, edit and amend the image data before the multi-functional peripheral 16 is operated.

Figure 2:
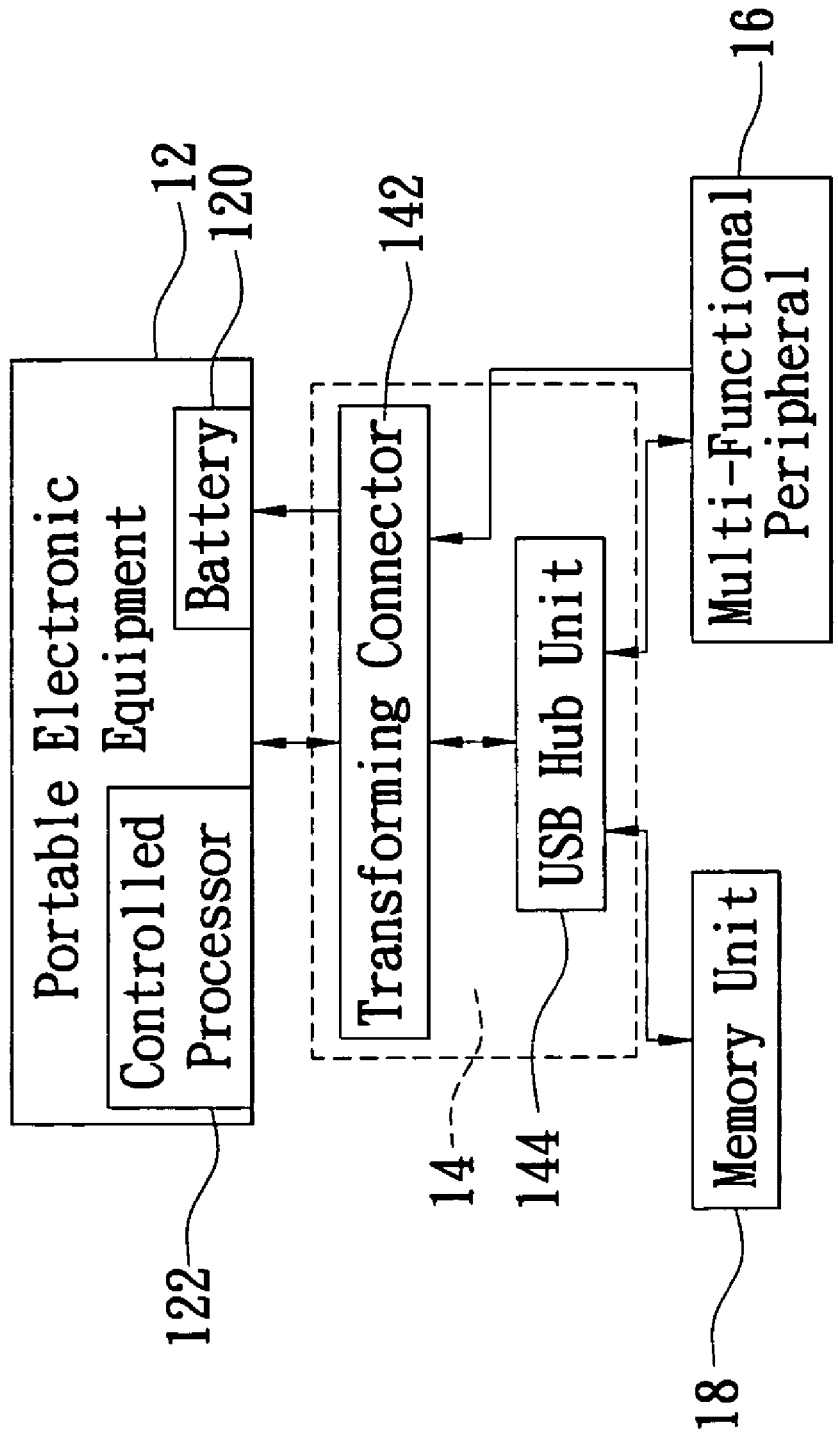
FIG. 2 is a block diagram showing a combination of the multi-functional peripheral combination apparatus according to the embodiment of the present invention.

FIG. 2 is a block diagram of the multi-functional peripheral combination apparatus according to the embodiment of the present invention. The transforming unit 14 includes a transforming connector 142 and a USB hub unit 144. The transforming connector 142 connects to the portable electronic equipment 12 and the USB hub unit 144, and the USB hub unit 144 connects to the multi-functional peripheral 16. By way of the transforming connector 142, the transmission specification can be alternated between the USB transmission format and the data transmission format of the portable electronic equipment 12. By way of the alternation of the transmission specification between the portable electronic equipment 12 and the multi-functional peripheral 16, the portable electronic equipment 12 can transmit data and control instructions into the multi-functional peripheral 16 through the USB hub unit 144, thereby to control the operation of the multi-functional peripheral 16. Additionally, the status of the operation of the multi-functional peripheral 16 can be transmitted into the portable electronic equipment 12 through the USB hub unit 144 and the transforming connector 142, thereby to display in the LED panel of the portable electronic equipment 12.

The portable electronic equipment 12 includes a wireless transmission card to transmit wirelessly a far-end image data from a wireless transmission electronic device. Additionally, by way of the process of the controlled processor 122 in the portable electronic equipment 12, the data and the control instructions can be transmitted into the multi-functional peripheral 16, so that the user can control the operation of the multi-functional peripheral 16.

In the embodiment illustrated in FIG. 2, the portable electronic equipment is connected to the multi-functional peripheral 16 via the transforming connector 142 so as to charge a battery 120 of the portable electronic equipment 12 through a power of the multi-functional peripheral 16. The multi-functional peripheral 16 has a plurality of control buttons 160 installed thereon as a human-machine interface. Furthermore, when the data is transmitting between the multi-functional peripheral 16 and the portable electronic equipment 12, these buttons 160 can assist to increase operation speed of the portable electronic equipment 12. These buttons 160 include the standard buttons installed in the multi-functional peripheral 16 and the independent buttons installed in the portable electronic equipment 12, and other forms of buttons mixing both types just mentioned.

With further reference to FIG. 2, a memory unit 18 is coupled to the USB hub unit 144. The memory unit 18 can be any type of memory suitable to for a USB interface, such as a hard-disk, a portable disk, a memory card, a digital camera, or a digital video for data storage and remembrance. The portable electronic equipment 12 can be a PDA (personal digital assistance) whose display panel is a touch panel to operate in human-machine interface. A memory card can be inserted into the portable electronic equipment 12 to expand the memory capacity.

When the multi-functional peripheral 16 and the PDA are linked to each other, the control instructions and the related data can be transmitted to the multi-functional peripheral 16 by way of the software scheme processed in the PDA and the human-machine interface operated by the touch panel. The PDA also monitors the operation of the multi-functional peripheral 16 by cooperating with the buttons 160 in the multi-functional peripheral 16. The working status of the multi-functional peripheral 16 can be transmitted to the PDA through the USB hub unit 144 and the transforming connector 142, and displayed in the touch panel of the PDA. In addition, the image data can be previewed, edited or amended by the touch panel of the PDA before printing of the multi-functional peripheral 16.

Figure 3:
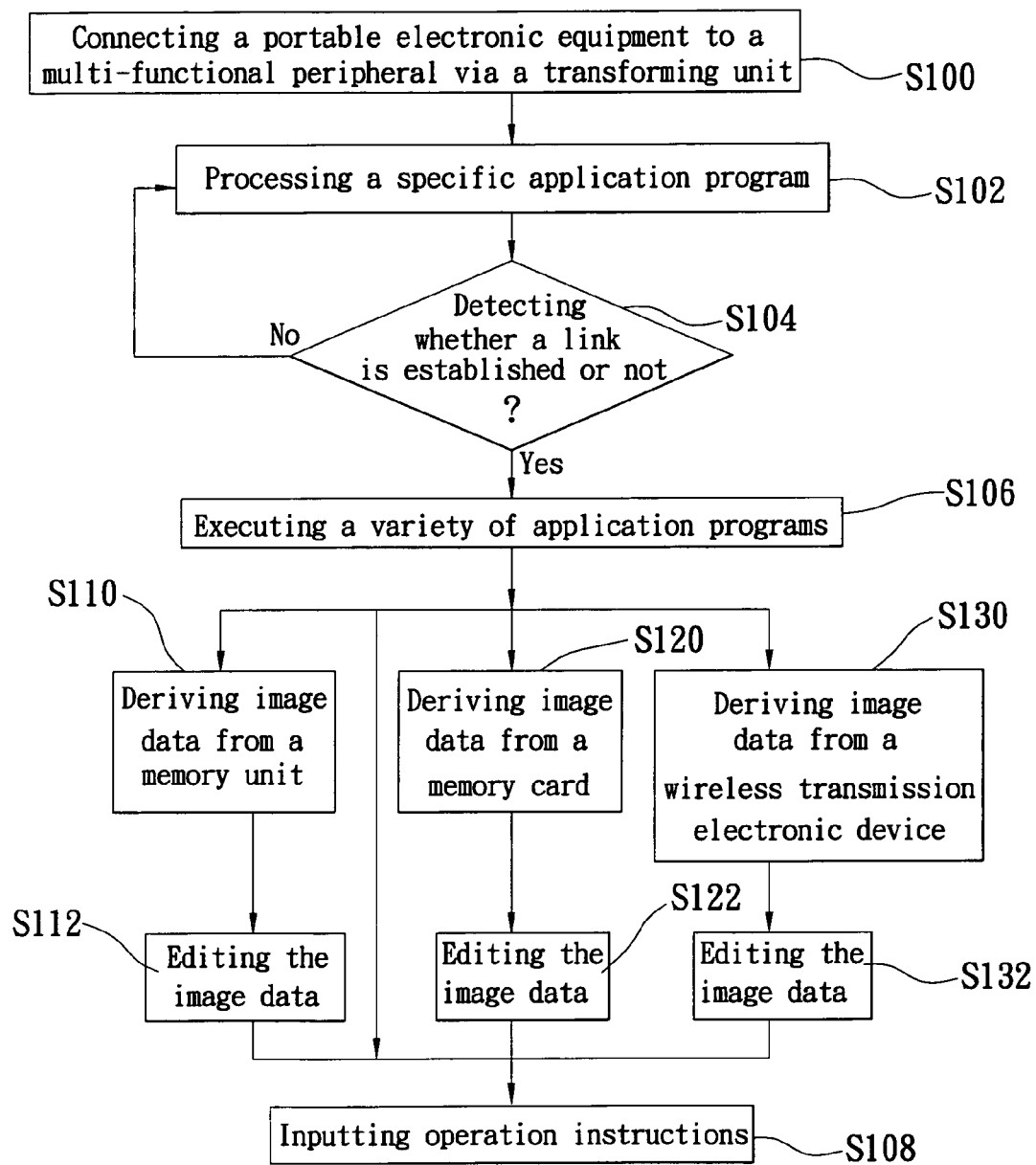
FIG. 3 is a flow chart illustrating a control method to control the multi-functional peripheral combination apparatus according to the embodiment of the present invention.

The step of the operation in accordance with the present invention is described in FIG. 3 as a flow chart of the embodiment illustrating the control method to control the multi-functional peripheral combination apparatus. First, the portable electronic equipment 12 is connected to the multi-functional peripheral 16 (S100). The specific application program configured by the controlled processor 122 of the portable electronic equipment 12 is processed (S102). Whether a link between the portable electronic equipment 12 and the multi-functional peripheral 16 is established or not is detected via the specific application program (S104). A variety of application programs of the multi-functional peripheral 16 are executed via the link of the portable electronic equipment 12 and the multi-functional peripheral 16 (S106). The last step is inputting operation instructions (S108) from the display panel of the portable electronic equipment 12 into the multi-functional peripheral 16.

After the step of processing a variety of application programs (S106), in accordance with different application programs, the operation of the present invention will derive an image data from the memory unit 18 (S110), edit the image data (S112), and then input the operation instructions (S108).

The operation described above can be another as that deriving the image data from the memory card (S120) installed in the portable electronic equipment 12, reading the image data via the controlled processor 122 of the portable electronic equipment 12, editing the image data from the display panel of the portable electronic equipment 12 (S122), and then inputting the operation instructions (S108).

There is another operation after executing the variety of application programs (S106). That operation will derive a far-end image data from a wireless transmission electronic device (not shown) into the portable electronic equipment 12 (S130), read the image data via the controlled processor 122 of the portable electronic equipment 12, edit the image data from the display panel of the portable electronic equipment 12 (S132), and then input the operation instructions (S108).

Referring simultaneously to FIG. 2 and FIG. 3. During the operation, the portable electronic equipment 12 will connect to the multi-functional peripheral 16 by way of the transforming unit 14, and operate the specific application program by the controlled processor 122 of the portable electronic equipment 12 to activate the basic functions offered by the portable electronic equipment 12. Next, due to the operation of the specific application program, whether the link between the portable electronic equipment 12 and the multi-functional peripheral 16 is established or not is detected. If the link is not established, the controlled processor 122 will execute the specific application program in the portable electronic equipment 12, and the detection of the link will be continuously operated. When the link is established, the controlled processor 122 of the portable electronic equipment 12 will automatically execute the image process, the archive management and the variety of application programs in the multi-functional peripheral 16. Additionally, the touch panel of the portable electronic equipment 12 can be a human-machine interface for use as a monitor, thereby to preview the working status of the multi-functional peripheral 16 and to input the operation instructions, such as, print, facsimile, scan, or copy.

In the specification above, when the memory unit 18 connects to the transforming unit 14, the controlled processor 122 will derive the image data from the memory unit 18 after the variety of application programs are executed by the portable electronic equipment 12. Then, the image data can be edited and previewed by the function of image management. Subsequently, the touch panel serves as a human-machine interface to input the operation instructions and drive the multi-functional peripheral 16 to perform functions such as, for instance, print, facsimile, scan, or copy.

Similarly, the controlled processor 122 can derive the image data from the memory card installed in the portable electronic equipment 12 after the variety of application programs are executed. Then, the image data can be edited and previewed by the function of image management. Subsequently, the touch panel serves as a human-machine interface to input the operation instructions and drive the multi-functional peripheral 16 to perform functions such as, for instance, print, facsimile, scan, or copy.

When the wireless transmission card is installed in the portable electronic equipment 12, the controlled processor 122 will derive the far-end image data stored in the wireless transmission electronic device by way of wireless transmission after the variety of application programs are executed in the portable electronic equipment 12. Then, the image data can be edited and previewed by the function of image management. Subsequently, the touch panel serves as a human-machine interface to input the operation instruction and drive the multi-functional peripheral 16 to perform functions such as, for instance, print, facsimile, scan, or Xerox.

In the specification above, the portable electronic equipment 12 will choose precisely the specific application program to operate the image, manage the archive or drive the various conditions of the multi-functional peripheral. By way of the touch panel as the human-machine interface, the multi-functional peripheral 16 connected to the portable electronic equipment 12 is woken up into normal mode by controlling the touch panel or pushed into sleep mode, or the power shut down.

To sum up, the multi-functional peripheral combination apparatus and control method thereof, utilizes the portable electronic equipment 12 to process the specific application program and the variety of application programs to edit images, manage archives, and drive the multi-functional peripheral by way of the connection with the multi-functional peripheral 16. Additionally, the human-machine interface and the monitor function can be operated by the touch panel installed in the portable electronic equipment 12 so as to input the operation instructions and control the working of the multi-functional peripheral 16, and to monitor the status of its working.

Further, the present invention will process the application program of archive management executed by the portable electronic equipment 12 to derive the image data from the memory unit 18, the memory card, or the wireless transmission electronic device, and process the application program to preview and edit the image data. Then, the multi-functional peripheral 16 approaches the designated job by way of the human-machine interface as the touch panel installed in the portable electronic equipment 12, and processing the application program to drive the multi-functional peripheral 16. Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A multi-functional peripheral combination apparatus that is separate from a personal computer, the apparatus comprising:
   a multi-functional peripheral;
   a portable electronic equipment having a display panel and a specific application program;
   a transforming unit electrically connected between the multi-functional peripheral and the portable electronic equipment, the transforming unit having a transforming connector separate from a USB hub unit, wherein the transforming connector is coupled to (a) the portable electronic equipment via a first cable and (b) the USB hub unit via a second cable, and wherein the USB hub unit is coupled to the multi-functional peripheral via a third cable, further wherein the transforming unit serves as an interface for data transmission between the portable electronic equipment and the multi-functional peripheral, and wherein the transforming connector is further configured to transform a data transmission format of the portable electronic equipment into a USB transmission format; and
   a separate memory unit selectively connected to the USB hub unit of the transforming unit, the memory unit being at least one of a hard disk, a portable disk, a memory card, a digital camera, and a digital video;
   wherein by processing the specific application program, the portable electronic equipment is configured to preview and/or edit data from the memory unit and send control instructions relating to the data to the multi-functional peripheral via the transforming unit, wherein the control instructions include at least one of print, fax, scan and copy.

2. The apparatus of claim 1 wherein the portable electronic equipment is a PDA (Personal Digital Assistant) with a processor.

3. The apparatus of claim 1 wherein the display panel is a touch panel configured to receive input to change a mode of the portable electronic equipment between one or more of a normal mode, a sleep mode, and a power down mode.

4. The apparatus of claim 1 wherein the multi-functional peripheral comprises a first group of control buttons and a second group of control buttons, wherein the second group of control buttons correspond to similar control buttons on the portable electronic equipment.

5. The apparatus of claim 4 wherein the first and second groups of control buttons are configured to operate the multi-functional peripheral independently from the portable electronic equipment.

6. The apparatus of claim 1 wherein the multi-functional peripheral is configured to charge a battery of the portable electronic equipment via the transforming unit.

7. The apparatus of claim 1 wherein the portable electronic equipment is further configured to monitor a status of the multi-functional peripheral from the display panel of the portable electronic device.

8. The apparatus of claim 1 wherein the data from the memory unit is first data and the portable electronic equipment further comprises a removable memory card, and wherein by processing the specific application program the portable electronic equipment is configured to preview and/or edit second data from the removable memory card and send the control instructions relating to the second data to the multi-functional peripheral via the transforming unit.

9. The apparatus of claim 1 wherein the data from the memory unit is first data and the portable electronic equipment is configured to wirelessly receive third data, and wherein by processing the specific application program the portable electronic equipment is configured to preview and/or edit the third data and send the control instructions relating to the third data to the multi-functional peripheral via the transforming unit.

10. The apparatus of claim 1 wherein the transforming connector is coupled to the multi-functional periphery via a fourth cable.

11. A multi-functional peripheral combination apparatus that is separate from a personal computer, the apparatus comprising:
    a multi-functional peripheral;
    a portable electronic equipment having a removable memory card, a display panel, and a specific application program;
    a transforming unit operably coupled to the multi-functional peripheral and the portable electronic equipment, the transforming unit having a transforming connector separate from a USB hub unit, wherein the transforming connector is coupled to (a) the portable electronic equipment via a first cable and (b) the USB hub unit via a second cable, and wherein the USB hub unit is coupled to the multi-functional peripheral via a third cable, further wherein the transforming unit is an interface for data transmission between the portable electronic equipment and the multi-functional peripheral, and wherein the transforming connector is further configured to transform a data transmission format of the portable electronic equipment into a USB transmission format; and
    a separate memory unit coupled to the USB hub unit;
    wherein by processing the specific application program, the portable electronic equipment is configured to preview and/or edit data from at least one of the memory unit and the memory card and send control instructions relating to the data to the multi-functional peripheral via the transforming unit, wherein the control instructions include at least one of print, fax, scan, and copy.

12. The apparatus of claim 11 wherein the portable electronic equipment is further configured to monitor a status of the multi-functional peripheral from the display panel of the portable electronic device.

13. The apparatus of claim 11 wherein the portable electronic equipment is a PDA (Personal Digital Assistant) including a processor.

14. The apparatus of claim 11 wherein the display panel is a touch screen.

15. The apparatus of claim 11 wherein the portable electronic equipment comprises a rechargeable battery, and wherein the multi-functional peripheral is configured to charge the battery via the transforming unit.

16. A system, comprising:
a transforming unit operably coupled between a multi-functional peripheral and a mobile electronic device having a specific application program, wherein the transforming unit comprises a transforming connector separate from a USB hub unit, the transforming connector being coupled to (a) the mobile electronic device via a first electrical connector and (b) the USB hub unit via a second electrical connector, and wherein the USB hub unit is coupled to the multi-functional peripheral via a third electrical connector, further wherein the transforming unit serves as an interface for data transmission between the mobile electronic device and the multi-functional peripheral; and a separate memory unit operably coupled to the USB hub unit;
wherein by processing the specific application program, the mobile electronic device is configured to preview and/or edit at least one of first data received wirelessly by the mobile electronic device and second data from the memory unit, and send control instructions relating to the first and second data to the multi-functional peripheral via the transforming unit, wherein the control instructions include at least one of print, fax, scan, and copy.

17. The system of claim 16 wherein the mobile electronic device is further configured to monitor a status of the multi-functional peripheral from a display panel of the mobile electronic device.

18. The system of claim 16 wherein the mobile electronic device is a PDA (Personal Digital Assistant) having a wireless transmission card and a touch screen display panel.

19. The system of claim 16 wherein the transforming connector has a first housing and the USB hub unit has a second housing separate from the first housing.

20. The system of claim 16 wherein the transforming connector is operably coupled to the multi-functional peripheral via a fourth electrical connector.

* * * * *

UNITED STATES PATENT AND TRADEMARK OFFICE
CERTIFICATE OF CORRECTION

PATENT NO.         : 7,574,532 B2                                                          Page 1 of 1
APPLICATION NO.    : 11/033815
DATED              : August 11, 2009
INVENTOR(S)        : Wang et al.

It is certified that error appears in the above-identified patent and that said Letters Patent is hereby corrected as shown below:

On the title page,

[*] Notice:    Subject to any disclaimer, the term of this patent is extended or adjusted under 35 USC 154(b) by (425) days Delete the phrase "by 425 days" and insert -- by 546 days --

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

PATENT NO.       : 7,574,532 B2
APPLICATION NO.  : 11/033815
DATED            : August 11, 2009
INVENTOR(S)      : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 667 days.

Signed and Sealed this

Fourteenth Day of December, 2010

David J. Kappos
*Director of the United States Patent and Trademark Office*